US011381530B2

(12) United States Patent
Jacobson

(10) Patent No.: US 11,381,530 B2
(45) Date of Patent: *Jul. 5, 2022

(54) INSTANTIATION OF DIALOG PROCESS AT A PARTICULAR CHILD NODE STATE

(71) Applicant: Google LLC, Mountain View, CA (US)

(72) Inventor: Alex Daniel Jacobson, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/881,760

(22) Filed: May 22, 2020

(65) Prior Publication Data

US 2020/0287852 A1   Sep. 10, 2020

Related U.S. Application Data

(63) Continuation of application No. 15/497,843, filed on Apr. 26, 2017, now Pat. No. 10,666,581.

(51) Int. Cl.
*H04L 51/02* (2022.01)
*H04L 67/10* (2022.01)
(Continued)

(52) U.S. Cl.
CPC .......... *H04L 51/02* (2013.01); *G06F 16/9027* (2019.01); *G06F 16/90332* (2019.01); *H04L 67/10* (2013.01); *H04L 67/32* (2013.01)

(58) Field of Classification Search
CPC ......... H04L 51/02; H04L 67/10; H04L 67/32; G06F 16/9027; G06F 16/90332
See application file for complete search history.

(56) References Cited

U.S. PATENT DOCUMENTS 9,645,707 B1 * 5/2017 Joyce ..................... G06F 16/958
2012/0173243 A1 * 7/2012 Anand ..................... G06F 40/40
704/270.1
(Continued)

FOREIGN PATENT DOCUMENTS

CN   104321765   1/2015
CN   105630887   6/2016
(Continued)

OTHER PUBLICATIONS

China Patent Office; First Office Action issued in Application No. 201810101440.4; 22 pages; dated Aug. 2, 2021.
(Continued)

*Primary Examiner* — Moustafa M Meky
*Assistant Examiner* — Kidest Mendaye
(74) *Attorney, Agent, or Firm* — Middleton Reutlinger

(57) ABSTRACT

Methods, systems, and apparatus, including computer programs encoded on a computer storage medium, for instantiating a dialog process at a particular child node state. In one aspect, a method includes receiving a request specifying a particular child node state of a dialog process, instantiating the dialog process at the root node state, providing input responses to the dialog process that cause the dialog process to traverse from the root node state to the particular child node state, where each input response is provided in response to an input request, and providing data that causes a user device to present the dialog process at the particular child node state.

18 Claims, 6 Drawing Sheets

(51) Int. Cl.
*H04L 67/60* (2022.01)
*G06F 16/9032* (2019.01)
*G06F 16/901* (2019.01)

(56) References Cited

U.S. PATENT DOCUMENTS

| | | | | |
|---|---|---|---|---|
| 2013/0055064 | A1* | 2/2013 | Mahmud | G06F 16/986 715/234 |
| 2014/0067825 | A1 | 3/2014 | Oztaskent et al. | |
| 2014/0304322 | A1* | 10/2014 | Dey | H04L 67/141 709/203 |
| 2015/0127631 | A1 | 5/2015 | Anand et al. | |
| 2016/0042735 | A1* | 2/2016 | Vibbert | G10L 15/222 704/257 |
| 2017/0091312 | A1 | 3/2017 | Ajmera et al. | |
| 2017/0169476 | A1 | 6/2017 | Nomula et al. | |
| 2017/0180284 | A1 | 6/2017 | Smullen et al. | |
| 2018/0062931 | A1* | 3/2018 | Joshi | H04L 67/16 |
| 2018/0174578 | A1* | 6/2018 | Bangalore | G06F 40/137 |
| 2018/0212904 | A1* | 7/2018 | Smullen | H04L 67/322 |
| 2018/0260856 | A1* | 9/2018 | Balasubramanian | G06F 40/211 |
| 2018/0341870 | A1* | 11/2018 | Joshi | G06N 5/003 |

FOREIGN PATENT DOCUMENTS

| | | |
|---|---|---|
| CN | 105787560 | 7/2016 |
| CN | 105845137 | 8/2016 |
| CN | 106095833 | 11/2016 |
| CN | 106453044 | 2/2017 |
| JP | 2002073887 | 3/2002 |
| JP | 2015526799 | 10/2015 |

OTHER PUBLICATIONS

European Patent Office; Communication Pursuant to Article 94(3) EPC issued in Application No. 17382138.6; 7 pages; dated Mar. 3, 2021.

PCT International Preliminary Reporton Patentability issued in International Application No. PCT/US2017/067694 dated Jul. 26, 2019. 22 Pages.

Bohus et al. "Larri: A Language-Based Maintenance and Repair Assistant," Jan. 1, 2002, [retrieved on Mar. 7, 2018] Retrieved from the Internet: URL<http://www.cs.cmu.edu/air~air/papers/LARRI-a-language-based.pdf> 13 Pages.

Bohus et al. The RavenClaw dialog management Framework: Architecture and Systems,: Computer Speech and Language, vol. 23(3) Jul. 1, 2009, 30 Pages.

Bourke. "Trees Trees, Binary Search Trees, Heaps & Applications," Jan. 31, 2015, [retrieved on Mar. 8, 2018] Retrieved from the Internet: URL<http://cse.unl.edu~cbourke/Lecture-trees.pdf> 32 Pages.

International Search Report and Written Opinion issued in International Application No. PCT/US2017/067694 dated Mar. 27, 2018. 17 Pages.

Zue et al. "Jupiter: A Telephone-Based Conversational Interface for Weather Information," IEEE Transactions on Speech and Audio Processing, vol. 8(1), Jan. 1, 2000. 12 Pages.

Japanese Patent Office; Notice of Reasons for Rejection issue in Application No. 2019-558465; 7 pages; dated Feb. 1, 2021.

Japanese Patent Office; Decision of Rejection issue in Application No. 2019-558465; 7 pages; dated Sep. 21, 2021.

China National Intellectual Property Administration; Notice of Grant issued for Application No. 201810101440.4; 6 pages; dated Feb. 9, 2022.

Japanese Patent Office; Notice of Allowance issued in Application No. 2019-558465, 3 pages, dated Apr. 11, 2022.

* cited by examiner

INSTANTIATION OF DIALOG PROCESS AT A PARTICULAR CHILD NODE STATE

BACKGROUND

A dialog process is a computer program, script, or any other set of instructions that, when executed by a computer device, simulate conversation with human users. Through these simulated conversations, a dialog process provides a wide range of automated assistance to users. A dialog process is often implemented by a state machine or graph process having multiple node states. Each state solicits one or more inputs from a user, and, depending on the input, traverses to another node state or takes a particular action.

Dialog processes, which may also be referred to as "chatbots," are widely used as part of messaging platforms, entertainment websites, and for customer service. Often a dialog process developer may desire that a user be taken to a particular node state of the dialog process. For example, assume a developer that has written a chatbot that helps users plan their travel has added to the chat bot a new functionality that helps users compare hotel room bookings. The developer would like to expose users to this functionality. However, to do so, users must traverse one or more chatbot states from an initial state to be exposed to the new functionality. Thus, unless users are directed to manually enter the necessary responses to reach the particular node state at which the new functionality will be exposed (and then follow the directions and actually manually enter necessary responses), or unless the developer creates a new chatbot that emphasizes the new functionality (which increases the customer's code base and risks losing users), many of the users will not be exposed to the new functionality.

SUMMARY

This specification describes technologies relating to providing a user with a deep-link into a specific sub-routine of a dialog process, such as a chatbot.

In general, one innovative aspect of the subject matter described in this specification can be embodied in methods that include the actions of receiving, at a server computer and from a user device, a request that specifies a particular child node state of a dialog process, where the dialog process defines multiple node states, the node states including a root node state and child node states, and where each child node state descends from at least one of another child node state or the root node state, and each node state specifies an input request and input response processing rules for processing an input response received in response to the input request and selects, based on the input response, one of the child node states that descend from the node state. The server computer instantiates the dialog process at the root node state in response to the request that specifies the particular child node state, and provides to the dialog process multiple input responses to the dialog process, where each input response is provided in response to an input request, and where a first input response of the provided input responses is provided for the input request of the root node state, and a last input response of the provided input responses is provided for the input request of a node state that is a parent of the particular child node state and causes the dialog process to select the particular child node state. The server computer then provides to the user device data that causes the user device to present the dialog process at the particular child node state. Other embodiments of this aspect include corresponding systems, apparatus, and computer programs, configured to perform the actions of the methods, encoded on computer storage devices.

Another innovative aspect of the subject matter described in this specification can be embodied in a system that includes a server computer that receives a request from a user device that specifies a particular child node state of a dialog process, where the dialog process defines a plurality of node states, the node states including a root node state and child nodes states, and wherein each child node state descends from at least one of another child node state or the root node state, and each node state specifies an input request and input response processing rules for processing an input response received in response to the input request and selecting, based on the input response, one of the child node states that descend from the node state. The system includes means for instantiating, in response to the request that specifies the particular child node state, the dialog process at the root node state, and means for providing, by the server computer, to the dialog process, a plurality of input responses to the dialog process, each input response provided in response to an input request, wherein a first input response of the provided input responses is provided for the input request of the root node state, and a last input response of the provided input responses is provided for the input request of a node state that is a parent of the particular child node state and causes the dialog process to select the particular child node state. The server computer provides data to the user device that causes the user device to present the dialog process at the particular child node state.

These and other embodiments can each optionally include one or more of the following features: In some implementations, the request that specifies the particular child node state of the dialog process includes an index key value for a dialog process index, where the dialog process index specifies, for each index entry, a particular child node state entry indexed by respective index key values, and a set of input responses that cause the dialog process to traverse from the root node state to the particular child node state. The multiple input responses provided to the dialog process can include accessing the particular child node state entry indexed by the index key value of the request, retrieving the set of input responses from the dialog process index, and then providing the set of input responses to the dialog process.

In some implementations, the request specifying the particular child node state of the dialog process includes the multiple input responses that cause the dialog process to traverse from the root node state to the particular child node state. The request can be specified by a uniform resource locator that includes the set of input responses as a query parameter.

In some implementations, the request is specified by a particular uniform resource identifier that references a resource that includes instructions that cause the dialog process to traverse from the root node state to the particular child node state, where the instructions can specify the multiple input responses.

In some implementations, each input response of the multiple input responses includes an input response to cause the dialog process to traverse to another node state.

In some implementations, the request specifying a particular child node state of the dialog process is based in part on user search history. The request specifying a particular child node state of the dialog process may be based in part on user browsing history.

Particular embodiments of the subject matter described in this specification can be implemented so as to realize one or more of the following advantages. Users are provided with a direct link (e.g., uniform resource identifier) to a particular child node state of a dialog process. Selection of the link causes the dialog process to instantiate at a root node state. The link causes the dialog process to be invoked in a manner that includes all of the necessary information to traverse from the root node state to a particular child node state of the dialog process. By providing the information to the dialog process to cause the dialog process to traverse to the particular child node state, the systems and methods ensure the user is exposed to the functionally of the particular child node state without requiring the user to input any responses to reach the particular child node state. Moreover, the need for custom code for a dialog process is obviated, such that the dialog process does not require reprogramming for each desired exposure to a particular child node state of the dialog process. This simplifies developer code bases and provides added flexibility over systems that require special coding of each dialog process.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Overview

Figure 1A:
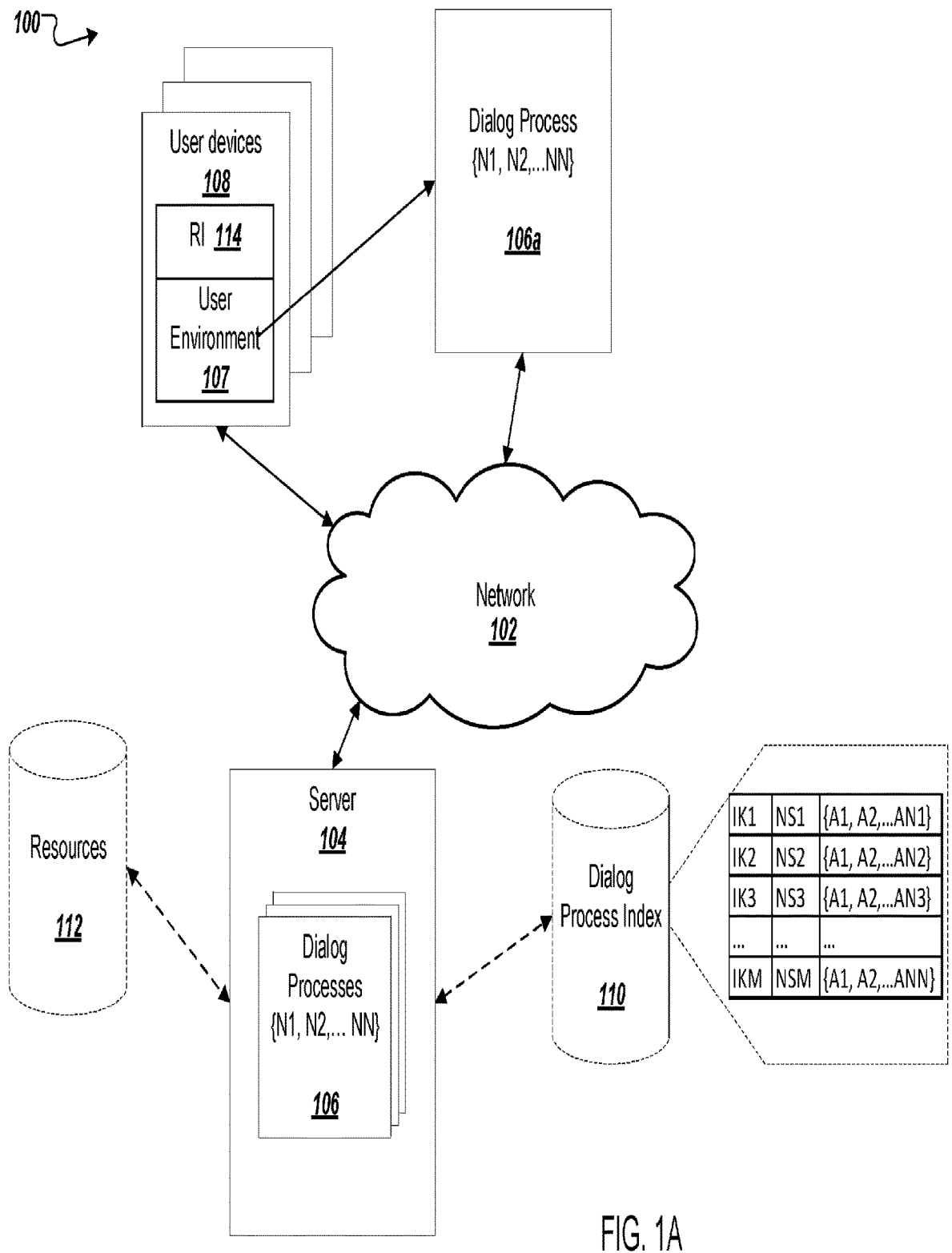
FIG. 1A is a block diagram of an example environment in which a dialog process may be invoked at a particular child node state for a user device.

Described below are systems and methods for providing a user with a deep link to a particular child node state of a dialog process, for example, a chatbot or artificial conversational entity. Selection of the link causes the dialog process to instantiate at a root node state. The link causes the dialog process to be invoked in a manner that includes all of the necessary information to traverse a dialog process to a particular child node state of the dialog process. The provisioning of the information to traverse the dialog process to the particular child node state can be done in a number of different ways. One way is encoding a uniform resource identifier with the information, e.g., in the form of a query parameter, and when the dialog process is invoked, the dialog process consumes the information. Another way is by encoding a uniform resource identifier with a token that indexes an index that includes the information, and the information is fetched from the index and provided to the dialog process upon invocation. Yet another way is by linking to a process, such as a script, that is programmed to provide the information to the dialog process upon invocation of the dialog process. A computer server receives a request for a dialog process at a particular child node state from a user device in response to the link being selected by a user of the user device.

The dialog process has multiple node states including a root node state and child node states. Each child node state of the dialog process descends from at least another child node state or the root node state of the dialog process. Each node state includes an input request and input response processing rules, where the input response processing rules determine how the node state will process a received input response and select a child node state that descends from the node state responsive to the input response.

For each request for a dialog process at a particular child node state, a dialog process is instantiated at the root node state of the dialog process. Multiple input responses are provided to the dialog process in response to the selection of the link. In some implementations, the responses may be provided by the server computer, while in other implementations, the response may be provided by the user device.

Each input response is provided to the dialog process in response to an input request. For example, a first input response is provided for the input request of the root node state of the dialog process, and a last input response is provided to the input request of a node state that is a parent of the particular child node state. Between the response provided for the root node state and the response provided for the node state that is a parent of the particular child node state, zero or more intermediate responses may be provided, depending on the depth of the particular child node state. Upon receiving the last input response, the dialog process will select the particular child node state.

In some implementations, the dialog process, upon reaching the particular child node state, is then presented at the user device. In other implementations, the dialog process may be presented at the user device as each of the input responses is provided to the dialog process so that the user may see the questions and responses that caused the dialog process to traverse to the particular child node state.

These features and additional features are described in more detail below.

Example Operating Environment

FIG. 1A is a block diagram of an example environment 100 in which a dialog process may be invoked at a particular child node state for a user device. A computer network 102, such as a local area network (LAN) the Internet, or a combination thereof, connects a server computer 104 that includes one or more dialog processes 106, and user devices 108. The server computer 104 is represented in FIG. 1A as a single entity, but can include multiple different servers in communication directly or over the network 102.

A user device 108 is an electronic device capable of requesting and receiving dialog processes 106 over the network 102. Example user devices 108 include personal computers, mobile communication devices, and other devices that can send and receive data over the network 102. A user device 108 typically includes a user application, such as a web browser, to facilitate the sending and receiving of data, including dialog processes 106, over the network 102. The web browser can enable a user to display and interact with text, images, videos, music and other information typically located on a web page at a website on the world wide web or a local area network.

Dialog Process Instantiation

A user device 108 may display a user environment 107 that includes a link 114 (or some other request instruction 114) to a particular child node state of a dialog process. The user environment 107 may be, for example, a web page, a user interface in a native application, a text message environment, or any other environment in which instructions may be provided that, when selected, cause the user device 108 to send a request to a server. The user on a user device 108 can request from the server 104 the presentation of a dialog process 106 at a particular child node state, for example, by selecting the request instruction 114. Each dialog process 106 has multiple node states {N1, N2, ... NN} including a root node state and child node states. Each child node state of a dialog process 106 descends from another child node state or the root node state. Each node state includes an input request (e.g., a question) and input response processing rules for processing an input response (e.g., an answer). For a particular input response provided in response to an input request of a node state, the node state will select one of the child node states that descend from the node state.

Figure 1B:
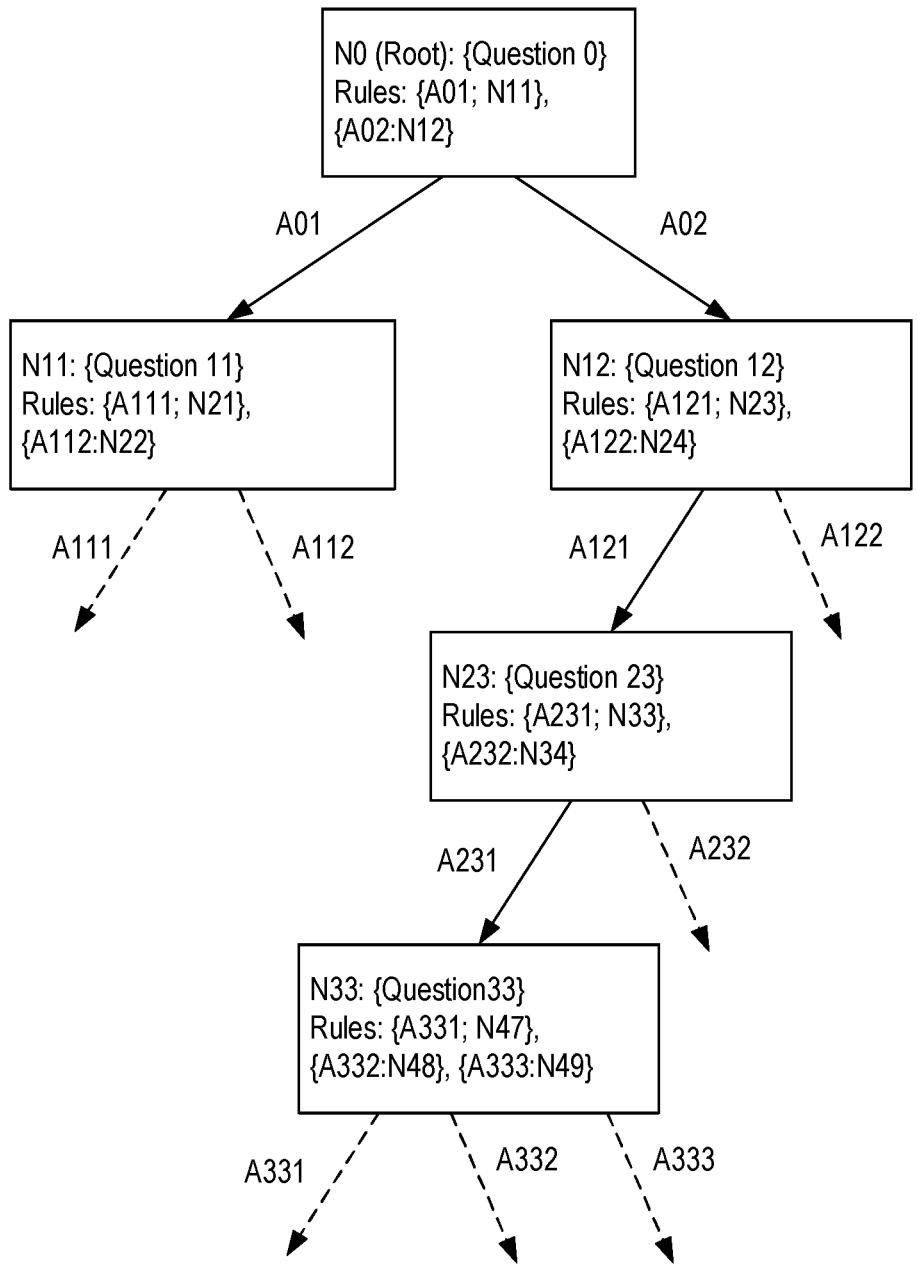
FIG. 1B is a graph of a subset of child node states descending from a root node state in a dialog process.

The relationships of node states in a dialog process is illustrated in FIG. 1B, which is a graph of a subset of node states descending from a root node N0 in a dialog process. The root node N0 includes an input request {Question 0} and rules for processing an input response. As shown in FIG. 1B, the rules resolve to two decisions—A01, which traverses to child node N11, and A02, which traverses to child node N12. For example, assume the question is "Do you want to book a new hotel reservation, or review an existing reservation?" The A01 branch may be any response or input that resolves to "book" and the A02 branch may be any response or input that resolves to "review." For brevity and to avoid drawing congestion, other node states that are indicated by the phantom branches are omitted from the drawing.

To traverse to the child node state N33, the dialog process must receive inputs that resolve to A02 for Question 0 at root node N0; A121 for Question 12 at child node N12; and A231 to question 23 at child node N23. The systems and methods described below allow a dialog process to instantiate at a root node state and automatically traverse from the root node state to a particular child node state.

As described above, three example ways of causing a dialog process to instantiate at a root node state and automatically traverse to a particular child node state are provided. The first way is encoding a uniform resource identifier with the information, and is describe in more detail with reference to FIG. 3A. The second way is by encoding a uniform resource identifier with a token that indexes an index that includes the information, and is described with reference to FIG. 3B. The third way is by linking to a process, such as a script, that is programmed to provide the information to the dialog process upon invocation of the dialog process, and is described with reference to FIG. 3C. These examples are not exhaustive, and other appropriate ways of causing a dialog process to instantiate at a root node and automatically traverse from the root node state to a particular child node may also be used.

Figure 2:
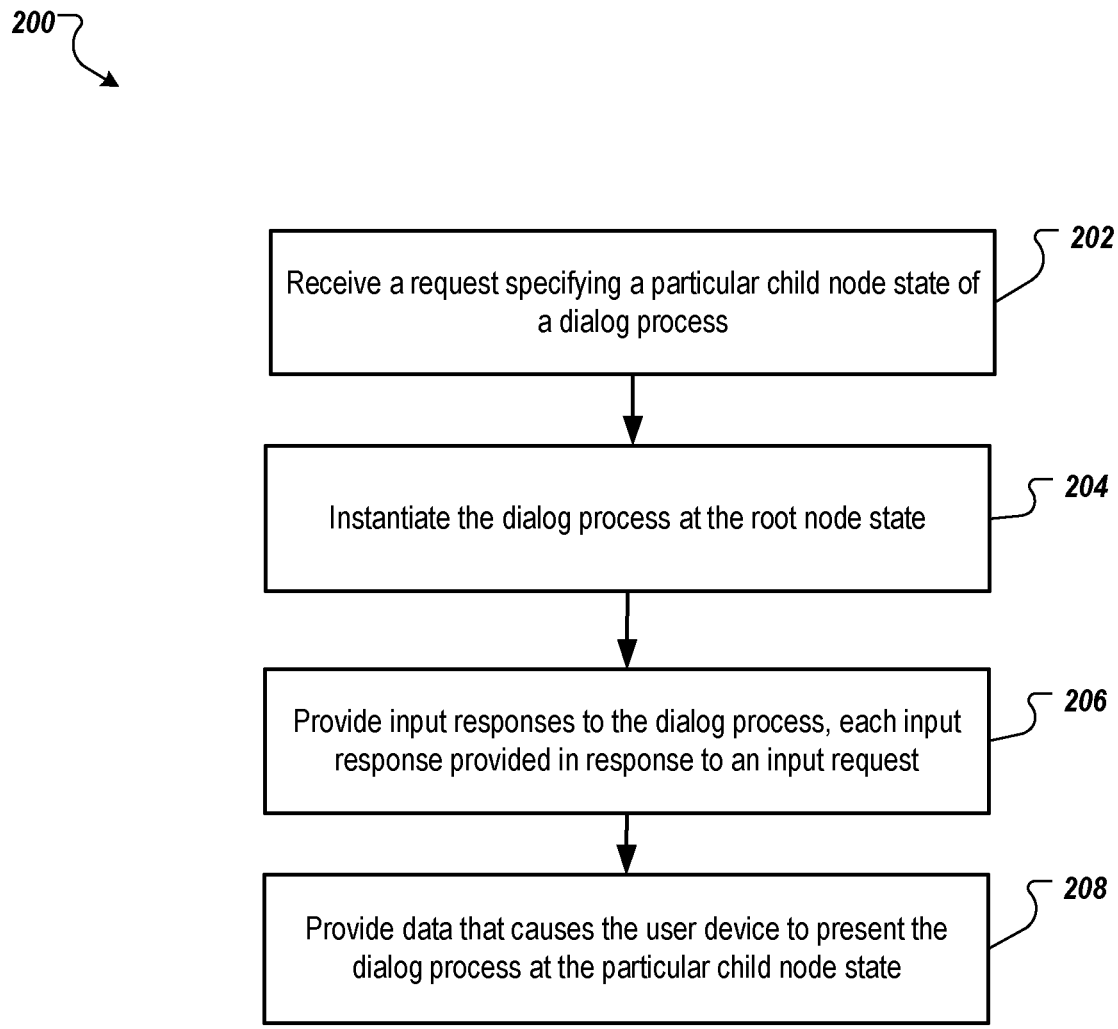
FIG. 2 is a flow diagram of an example process for instantiating a dialog process at a particular child node state.

FIG. 2 is a flow diagram of an example process 200 for instantiating a dialog process 106a at a particular child node state. The process 200 may be performed by a computer system, such as a server computer 104.

The server 104 receives a request 114 to provide the dialog process 106a at a particular child node state to a user device 108 (202). The request may be generated by selecting a uniform resource identifier, such as a uniform resource locator (URL). What is encoded in the link and the resulting request may depend on the instantiation process the system uses to instantiate the dialog process at the root node state and automatically traverse from the root node state to a particular child node state. For example, the request 114 may include input responses as a query parameter. Alternatively, the request 114 may include a reference to an index key value for a dialog process index 110, where the index key value references an index entry for the particular child node state and a set of input responses. In yet another alternative, the request may refer to a resource, where the resource 112 (e.g., a webpage) includes instructions and information pertaining to a set of input responses. These different request types are respectively described with reference to FIGS. 3A-3C below.

After receiving the request 114, the server 104 instantiates the dialog process 106a at the root node state of the dialog process (204). While the dialog process 106a is instantiated in an environment on the server 104, separate from the user device 108, in some implementations, the dialog process 106a may instead be instantiated in an environment on the user device 108, for example.

The server 104 provides multiple input responses to the dialog process, where each input response is provided in response to an input request (206). Provision of the responses may be done according to the request type, examples of which are described with reference to FIGS. 3A-3C below. By providing a set of particular input responses to the dialog process 106a, the dialog process 106a traverses from the root node state to the particular child node state. For example, an airline ticket reservation dialog process may provide an input request at a root node state "Where are you flying to today?" with a corresponding input response "Honolulu, Hi." The dialog process 106a may then select a descendent child node state whose input request is "Would you like to check-in?" with a possible input response "Yes," and so forth until the particular child node state is reached.

More specifically, with reference to FIG. 1B, responses that resolve to A01, A121 and A231 may be provided to traverse to the child node state N33. Each response need only be data that is required to resolve to a state. For example, if the question requires a numeric input of 1, 2 or 3 to resolve to respective child node states 1, 2 or 3, then a response that resolves to "1" may be the number "1" or the word "one," and so on. Should the rule set include semantic rules, then the response need only be data that is required to resolve to a state. For example, if the question that solicits input is "Tell us if you want to book a flight, manage a reservation, or cancel a flight," then inputs that resolve to "book a flight" may be words or phrases like "book," "make a flight," or "buy ticket." Any one of these words or phrases may be used as the input response for the node state. Thus, if the traversal requires the node state to resolve to "book a flight," the input response may simply be "book."

The input responses for a traversal to a node state may be provided by the dialog process author, or may be discovered by machine learning techniques. In the case of the former, the dialog process author may provide string delimited responses for a particular node state, e.g., for the dialog process of FIG. 1A, the string may be {A01}; {A121}; {A231} to traverse to node N33, where any {•} for a node is an alphanumeric value that causes the dialog process processing rules for the node to select the required state in the traversal to the particular child node state. In the case of the latter, a virtual machine may be programmed to interpret input request for each node state of a dialog process, provide input responses to the dialog process, and learn a dialog process "dialog map" (similar to a site map) that describes the hierarchy of the dialog process.

Once the dialog process 106a has traversed to the particular child node state, the server 104 provides data to the user device that causes the user device 108 to present the dialog process 106a at the particular child node state (208). The dialog process 106a may be presented to the user device 108 in the form of a new window in an application environment, and may be presented along with additional information related to the dialog process 106a.

Input Response Encoding in Link

Figure 3A:
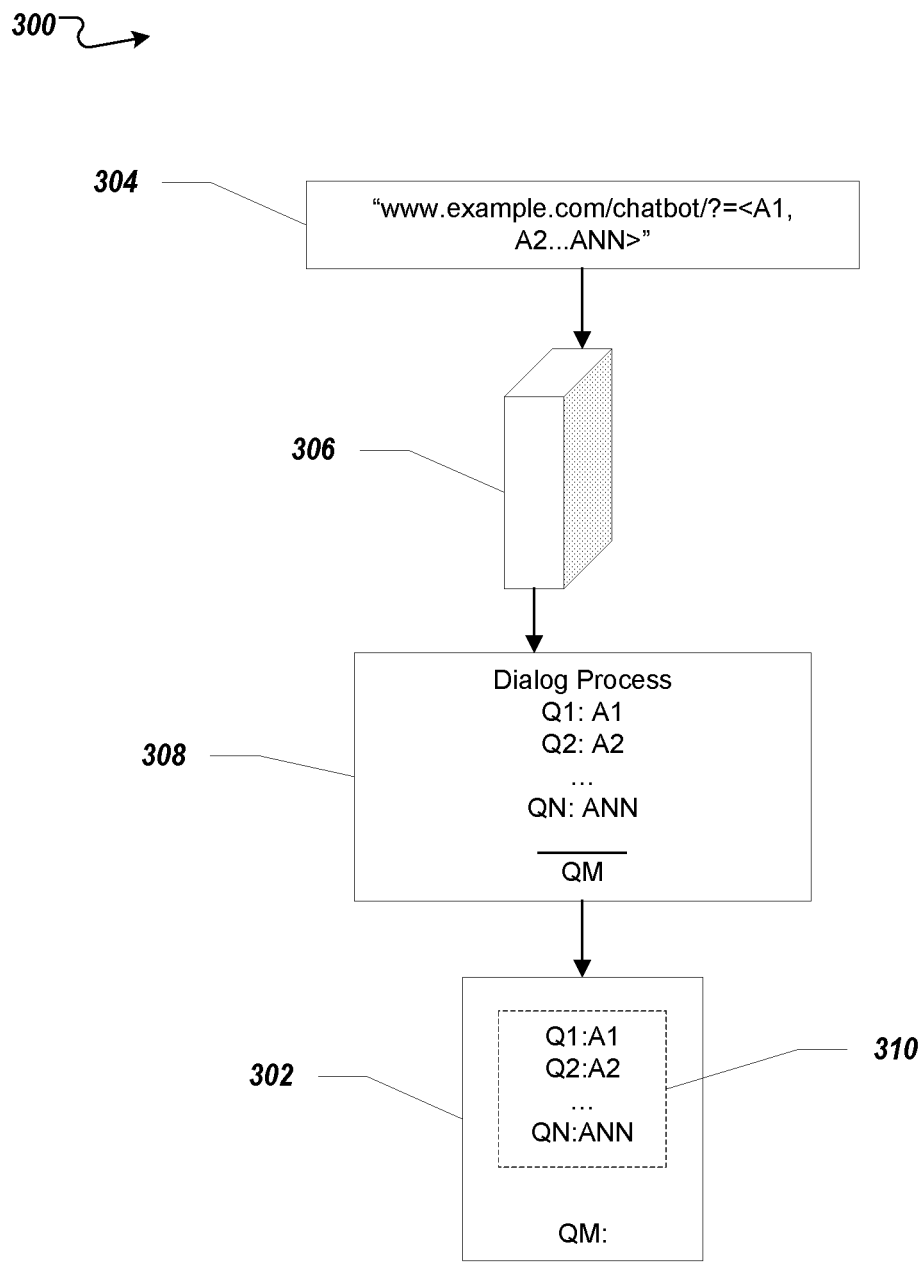
FIGS. 3A-C are block diagrams of various example system process flows for instantiating a dialog process at a particular child node state Like reference numbers and designations in the various drawings indicate like elements.

As described with reference to FIGS. 1A-B and FIG. 2, various methods may be implemented to provide a dialog process at a particular child node state to a user device. FIG. 3A is a block diagram of an example process 300 for instantiating a dialog process at a particular child node state 302. In FIG. 3A, the request 304 is generated from a URL that includes a set of input responses as a query parameter. When the dialog process is invoked, the dialog process consumes the information included in the query parameter.

For example, in FIG. 3A, the input responses (e.g., {A1, A2, . . . AN}) are included in the URL as a query parameter. The URL links to a location at which the dialog process may be invoked in response to the request, e.g., www.example/com/chatbot. A server 306 may receive the request 304 generated from a selection of the URL and in response, instantiation of the dialog process 308.

The set of input responses provided with the request 304 as the query parameter are provided to the dialog process 308. Each input response of the set of input responses is provided, in turn, in response to an input request from the dialog process 308. The dialog process 308 may be programmed to determine if input requests are provided as command arguments upon invocation and process the input requests accordingly. If no input requests are provided, then the dialog process waits for an input from an I/O device. For example, in response to the request generated by the URL 304 selection, a first input response "A1" is provided in response to input request "Q1;" a second response is provided in response to the input request "Q2," and so on until a last input response "AN" is provided in response to input request "QN." When the dialog process receives input response "AN," the dialog process selects a descending node state that is the particular child node state "M."

Data to cause the dialog process 302 at the particular child node state "M" to be displayed at the user device is then provided to the user device 108. In some implementations, the input requests and/or the set of input responses 310 provided to the dialog process to traverse from the root node state to the particular child node state of the dialog process 302 are also provided to the user of the user device 108. This allows for display to the user of a complete conversational context from the root node state to the child node state. For example, a textual and/or graphical display 310 within or included with the dialog process 302 on a user device 108 may present the set of input requests (e.g., questions from the dialog process to the user) and respective input responses (e.g., answers provided to the dialog process by the server) corresponding to the node states traversed from the root node state to the particular child node state (e.g., "QM"). In other implementations, only the input request of the child node state is provided to the user device.

In some implementations, providing the input requests and/or set of input responses 310 may include displaying, on the user device 108, a summary of the input requests and/or set of input responses 310. A summary can include presenting the relevant information to the user of the user device 108 is provided along with or as a part of the dialog process 302 at the particular child node state. For example, for input requests "where would you like to fly to," "do you need to book a hotel at your destination," and "would you like to book a rental car at your destination," and the corresponding set of input responses provided "Hawaii," "Yes," and "Yes," a summary of this information is: "You would like to purchase plane tickets to go to Hawaii and book a hotel room and a rental car while you are visiting?" Other methods of displaying (e.g., textually or graphically) information pertaining to the input requests and/or set of input responses may be used.

Input Response from Indexed Response Sets

Figure 3B:
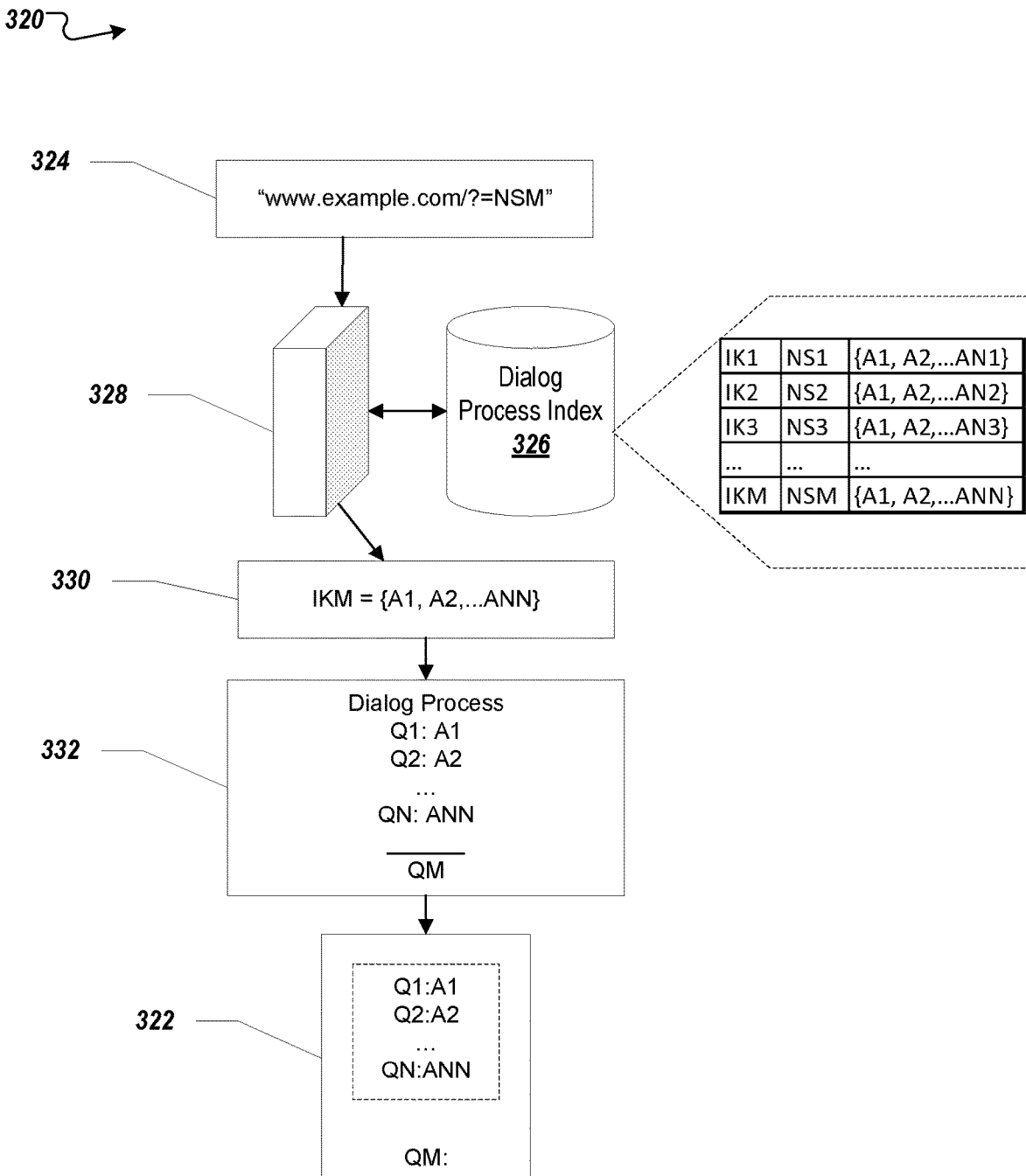

As described above with reference to FIGS. 1A-B, a request 114 may include a URL containing a reference to an index key value for a dialog process index 110, where the index key value references an index entry for the particular child node state and a set of input responses. Using the key value, the server fetches the input response from the index and provides the response to the dialog process upon invocation. FIG. 3B is a block diagram of an example process 320 for instantiating dialog process 322 at a particular child node state by means of a request 324, where the request 324 includes a reference to an index key value for a dialog process index 326. In some implementations, server 104 includes a dialog process index 326. The dialog process index 326 can contain multiple index entries (e.g., NS1, NS2, etc.), each index entry representing a particular child node state indexed by a respective index key value (e.g., IK1, IK2, etc.), and a set of input responses (e.g., {A1, A2 . . . AN1}, {A1, A2 . . . AN2}, etc.) that cause a dialog process 332 to traverse from a root node state to the particular child node state. For example, an index entry represented by index key IK1, and corresponding to a particular child node state NS1 contains the set of input responses {A1, A2, . . . AN1}.

In some implementations, request 324 may include a reference specifying the particular child node state of the dialog process, including an index key value corresponding to a dialog process index 326, stored on a server 328. For example, an index entry for a particular child node state "M" (e.g., node state M (NSM)) of a dialog process may include an index key value "IKM" and a set of input responses 330 {A1, A2, . . . ANN} which would cause the dialog process 332 to traverse from the root node state to the particular child node state "M." More specifically, each node in the dialog process may correspond to an index entry, and the recorded values may be the responses to traverse from the root node to the particular child node indexed by the index entry. For example, for the hierarchy of FIG. 1A, an index entry for the node N12 may include the value {A01}. Likewise, for the index entry for the node N23, the value may be {A01}; {A121}, and so on.

The dialog process index 326 may be provided by the dialog process author, or may be generated by an automated process. For example, as described above, a virtual machine may be programmed to generate a "dialog map." The dialog map may then be used to generate the index.

The server 328 receives the request 324 and accesses, from the dialog process index 326 and by using the index key value, the particular child node state index entry represented by the index key value. From the index entry NSM, the server may retrieve a set of input responses 330. For example, for index key value "IKM" the set of input responses 330 {A1, A2, . . . ANN} may be retrieved by the server 328.

The server 328 may then instantiate a dialog process 332 at a root node state, and provide the set of input responses 330 to the dialog process 332 that causes the dialog process 332 to traverse from the root node state the particular child node state "M," in a similar manner as discussed with reference to FIG. 3A. Data to cause the dialog process at the particular child node state "M" 322 to be displayed at the user device is then provided to the user device 108.

Input Response from Resource Instructions

Figure 3C:
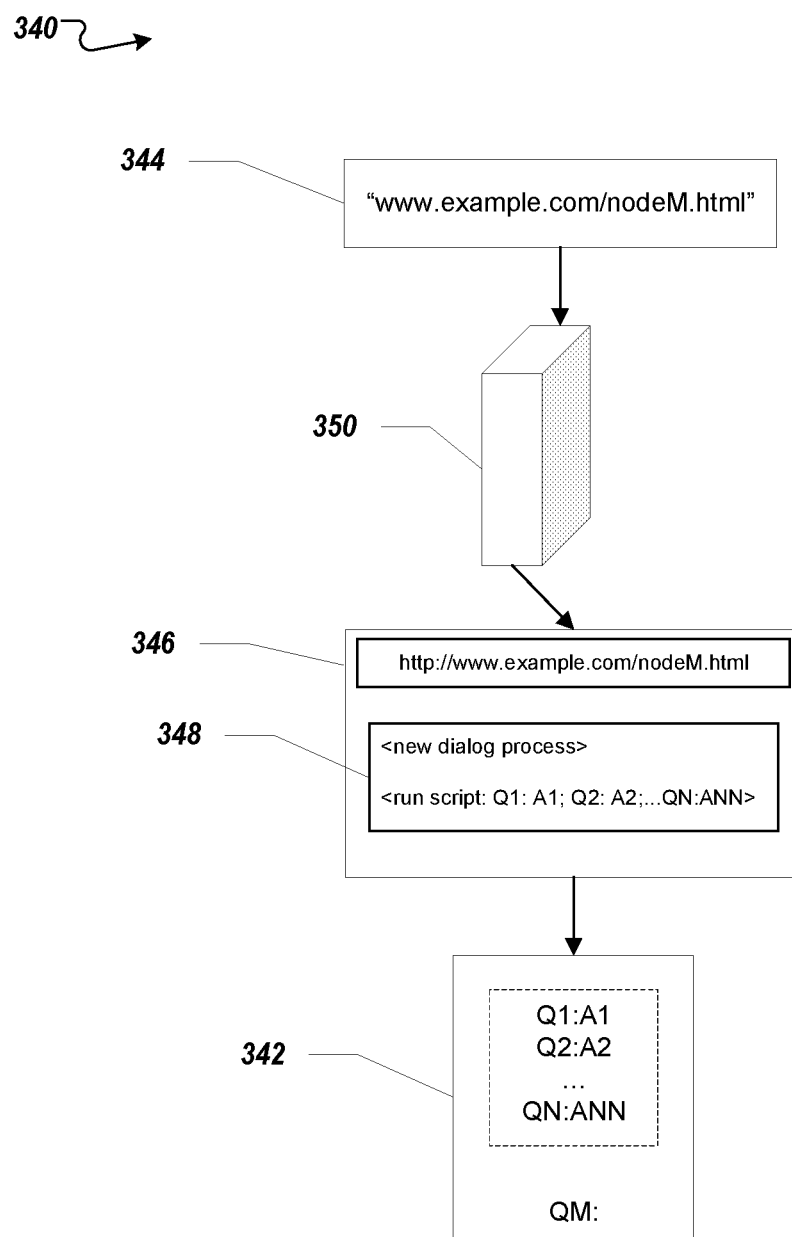

In some implementations, as discussed with reference to FIGS. 1A-B, a request 114 may include a URL containing a reference to a resource 112, where the resource (e.g., a webpage) includes information and instructions, e.g., a script, that when executed provides the information to the dialog process upon invocation of the dialog process. FIG. 3C is a block diagram of an example process 340 for instantiating a dialog process 342 at a particular child node state by means of a request 344 that references a resource 346 including instructions 348. The information 348 included in a resource may include multiple input responses that can be provided in response to the input requests of the dialog process to traverse to another node state until reaching the particular child node state. Once the particular child node state is achieved, the server, as instructed by the script, provides data that causes the user device to present the dialog process 342 at the particular child node state.

In some implementations, information 348 is a script written for a run-time environment that automates the execution of tasks. Scripts may be written using a scripting language (e.g., Perl or Python). For example, information 348 may include executable tasks including: generating a new dialog process in the root node state and providing to the dialog process with a set of input responses (e.g., {A1, A2, . . . ANN}) responsive to input requests of the dialog process (e.g., {Q1, Q2, . . . QN}).

In some implementations, a different URL is used for each node state of the dialog process, where the information 348 for each request 344 is customized with instructions to cause a dialog process to traverse to a particular child node state of the dialog process. For example, request 344 for a particular child node state "M" may be generated from a URL reference to a resource containing information 348, where information 348 is a script that causes a dialog process to traverse from the root node state to the particular child node state "M." A different request 344 for a particular child node state "Q", may be generated from a different URL reference to a different resource containing different information that causes the dialog process to traverse from the root node state to the particular child node state "Q."

Node State Selections

When a dialog process owner desires to expose users to a particular feature with a dialog process, the dialog process owner may create a resource with a link that, when selected, instantiates the dialog process to a root node state and causes the dialog process to automatically traverse from the root node state to a particular child node state.

In other implementations, a request for a particular child node state of a dialog process is based in part on user search history and/or browsing history of a user of the user device 108. For example, a server may use current session data of a user device to determine current user interests based on, for example, keywords and topics. For example, a travel agency website may determine that a user has an interest in traveling to Hawaii and serve a content item for instantiating a chatbot of the travel agency. However, instead of requiring a user to enter multiple responses to get to a node state in the chatbot specific to Hawaii, e.g., "We have travel specials for Hawaii. Would you like to learn about them?" the chatbot will be instantiated at a root node state and caused to automatically traverse to this particular child node state by use of one (or more) of the processes described above. To illustrate, assume that FIG. 1A depicts information in an index for the chatbot, and the desired child node state is N33. The record may be of the form:

| Key | Node | Question | Response Path |
| --- | --- | --- | --- |
| 27F3 | N33 | We have travel specials for Hawaii. Would you like to learn about them? | {Book}; {Domestic}; {Hawaii} |

Given the user's interests are determined to be traveling domestically to Hawaii, the user may have an interest vector that indicates domestic travel to Hawaii is the user's current interest. Accordingly, the node N33 may be selected as having a relevance score higher than all other nodes for the chatbot. The relevance score may be determined by any appropriate scoring algorithm, such as by cosine similarity of terms in the question and response path fields to the user's current interest vector of terms. Accordingly, the link that is generated for the chatbot and served to the user device will cause the chatbot, upon instantiation if the link is selected by the user, to consume as input the following responses to the following questions:

| Question | Response |
| --- | --- |
| Do you want to book a flight or cancel a flight? | Book |
| Are you interested in foreign or domestic travel? | Domestic |
| What state do you want to travel to? | Hawaii |
| We have travel specials for Hawaii. Would you like to learn about them? | <Await user input> |

The dialog process at the particular child node state is then presented at the user device, without the user having had to enter the responses of "Book," "Domestic," and "Hawaii."

Additional Implementation Details

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by one or more processors, the method comprising:
    automatically generating a dialog map for a dialog process,
        wherein the dialog map describes a hierarchy of the dialog process, and
        wherein the dialog process defines a plurality of node states,
        wherein the node states include a root node state and child nodes states, and
        wherein each child node state descends from at least one of another child node state or the root node state;
    subsequent to automatically generating the dialog map:
        receiving, at a server computer and from a user device of a user, a request that specifies a particular child node state of the child node states of the dialog process;
        in response to receiving the request that specifies the particular child node state of the dialog process:
            instantiating, by the server computer, the dialog process at the root node state;
            automatically traversing, based on the dialog map, from the root node state to the particular child node state, wherein automatically traversing, based on the dialog map, from the root node state to the particular child node state comprises:
                prior to traversing to the particular child node state, traversing to an intermediate child node state of the child node states without requiring any user input, from the user of the user device, to reach the intermediate child node state, wherein the particular child node state descends from the intermediate child node state; and
                traversing from the intermediate child node state to the particular child node state without requiring any user input, from the user of the user device, to reach the particular child node state; and
            providing, by the server computer and to the user device, data that causes the user device to present the dialog process at the particular child node state for presentation to the user.

2. The method of claim 1, wherein automatically generating the dialog map comprises using a virtual machine to interpret inputs requests for each of the node states and to provide input responses to the dialog process.

3. The method of claim 1, wherein each node state specifies an input request that is output by the dialog process and input response processing rules for processing an input response received in response to the input request.

4. The method of claim 3, wherein the input response processing rules determine how the node state will process the received input response and select, based on the input response, one of the child node states that descend from the node state responsive to the input response.

5. The method of claim 3, further comprising:
    generating an index based on the dialog map;
        wherein automatically traversing, based on the dialog map, from the root node state to the child node state comprises using the index in automatically traversing from the root node state to the child node state.

6. The method of claim 3, wherein the request specifying a particular child node state of the dialog process is based in part on user search history.

7. The method of claim 3, wherein the request specifying a particular child node state of the dialog process is based in part on user browsing history.

8. The method of claim 1, wherein traversing from the intermediate child node state to the particular child node state comprises:
    providing, to the dialog process, a particular input response selected based on the particular child node state specified in the request.

9. A system, comprising:
    a data processing apparatus; and
    a non-transitory computer readable medium storing instructions executable by the data processing apparatus and thus upon such execution cause the data processing apparatus to perform operations comprising:
        automatically generating a dialog map for a dialog process,
            wherein the dialog map describes a hierarchy of the dialog process, and
            wherein the dialog process defines a plurality of node states,
            wherein the node states include a root node state and child nodes states, and
            wherein each child node state descends from at least one of another child node state or the root node state;
        subsequent to automatically generating the dialog map:
            receiving, from a user device of a user, a request that specifies a particular child node state of the child node states of the dialog process;

in response to receiving the request that specifies the particular child node state of the dialog process:
  instantiating, by a server computer, the dialog process at the root node state;
  automatically traversing, based on the dialog map, from the root node state to the particular child node state, wherein automatically traversing, based on the dialog map, from the root node state to the particular child node state comprises:
    prior to traversing to the particular child node state, traversing to an intermediate child node state of the child node states without requiring any user input, from the user of the user device, to reach the intermediate child node state, wherein the particular child node state descends from the intermediate child node state; and
    traversing from the intermediate child node state to the particular child node state without requiring any user input, from the user of the user device, to reach the particular child node state; and
  providing, to the user device, data that causes the user device to present the dialog process at the particular child node state for presentation to the user.

10. The system of claim 9, wherein automatically generating the dialog map comprises using a virtual machine to interpret inputs requests for each of the node states and to provide input responses to the dialog process.

11. The system of claim 9, wherein each node state specifies an input request that is output by the dialog process and input response processing rules for processing an input response received in response to the input request.

12. The system of claim 11, wherein the input response processing rules determine how the node state will process the received input response and select, based on the input response, one of the child node states that descend from the node state responsive to the input response.

13. The system of claim 11, the operations further comprising:
  generating an index based on the dialog map;
    wherein automatically traversing, based on the dialog map, from the root node state to the child node state comprises using the index in automatically traversing from the root node state to the child node state.

14. The system of claim 11, wherein the request specifying a particular child node state of the dialog process is based in part on user search history.

15. The system of claim 11, wherein the request specifying a particular child node state of the dialog process is based in part on user browsing history.

16. The system of claim 9, wherein traversing from the intermediate child node state to the particular child node state comprises:
  providing, to the dialog process, a particular input response selected based on the particular child node state specified in the request.

17. The system of claim 9, wherein automatically traversing, based on the dialog map, from the root node state to the particular child node state further comprises:
  automatically traversing from the root node state to the particular child node state without requiring any additional user input to reach the particular child node state.

18. A non-transitory computer readable medium storing instructions executable by a data processing apparatus and thus upon such execution cause the data processing apparatus to perform operations comprising:
  automatically generating a dialog map for a dialog process,
    wherein the dialog map describes a hierarchy of the dialog process, and
    wherein the dialog process defines a plurality of node states,
    wherein the node states include a root node state and child nodes states, and
    wherein each child node state descends from at least one of another child node state or the root node state;
  subsequent to automatically generating the dialog map:
    receiving, at a server computer and from a user device of a user, a request that specifies a particular child node state of the child node states of the dialog process;
    in response to receiving the request that specifies the particular child node state of the dialog process:
      instantiating, by the server computer, the dialog process at the root node state;
      automatically traversing, based on the dialog map, from the root node state to the particular child node state, wherein automatically traversing, based on the dialog map, from the root node state to the particular child node state comprises:
        prior to traversing to the particular child node state, traversing to an intermediate child node state of the child node states without requiring any user input, from the user of the user device, to reach the intermediate child node state, wherein the particular child node state descends from the intermediate child node state; and
        traversing from the intermediate child node state to the particular child node state without requiring any user input, from the user of the user device, to reach the particular child node state; and
      providing, by the server computer and to the user device, data that causes the user device to present the dialog process at the particular child node state for presentation to the user.

* * * * *